United States Patent [19]
Manz et al.

[11] Patent Number: 5,209,077
[45] Date of Patent: May 11, 1993

[54] REFRIGERANT RECOVERY SYSTEM

[75] Inventors: Kenneth W. Manz, Paulding; Christopher M. Powers, Bryan, both of Ohio; Charles E. Dull, Fort Wayne, Ind.

[73] Assignee: SPX Corporation, Muskegon, Mich.

[21] Appl. No.: 799,433

[22] Filed: Nov. 26, 1991

[51] Int. Cl.[5] .............................................. F25B 45/00
[52] U.S. Cl. ........................................ 62/149; 62/292
[58] Field of Search ...................... 62/85, 77, 149, 292, 62/475

[56] References Cited
U.S. PATENT DOCUMENTS

| | | | |
|---|---|---|---|
| 4,261,178 | 4/1981 | Cain | 62/149 |
| 4,441,330 | 4/1984 | Lower et al. | 62/149 |
| 4,768,347 | 9/1988 | Manz et al. | 62/149 |
| 4,856,289 | 8/1989 | Lofland | 62/149 |
| 4,981,020 | 1/1991 | Scuderi | 62/149 |

*Primary Examiner*—John M. Sollecito
*Attorney, Agent, or Firm*—Barnes, Kisselle, Raisch, Choate, Whittemore & Hulbert

[57] ABSTRACT

A refrigerant recovery system that includes a refrigerant accumulator having an inlet port for connection to the liquid port of equipment from which refrigerant is to be recovered, a vapor outlet port connected to the inlet of a refrigerant compressor, and a liquid outlet port. A valve connects the liquid outlet port of the accumulator to the inlet of a liquid refrigerant pump, which has an outlet for connection to a refrigerant storage container. A liquid refrigerant sensor is coupled to the accumulator and responsive to presence of liquid refrigerant within the accumulator for operating the valve and thereby connecting the accumulator liquid outlet port to the liquid pump. A second valve is responsive to the liquid refrigerant sensor for connecting the compressor outlet to the vapor port of refrigeration equipment under service.

16 Claims, 2 Drawing Sheets

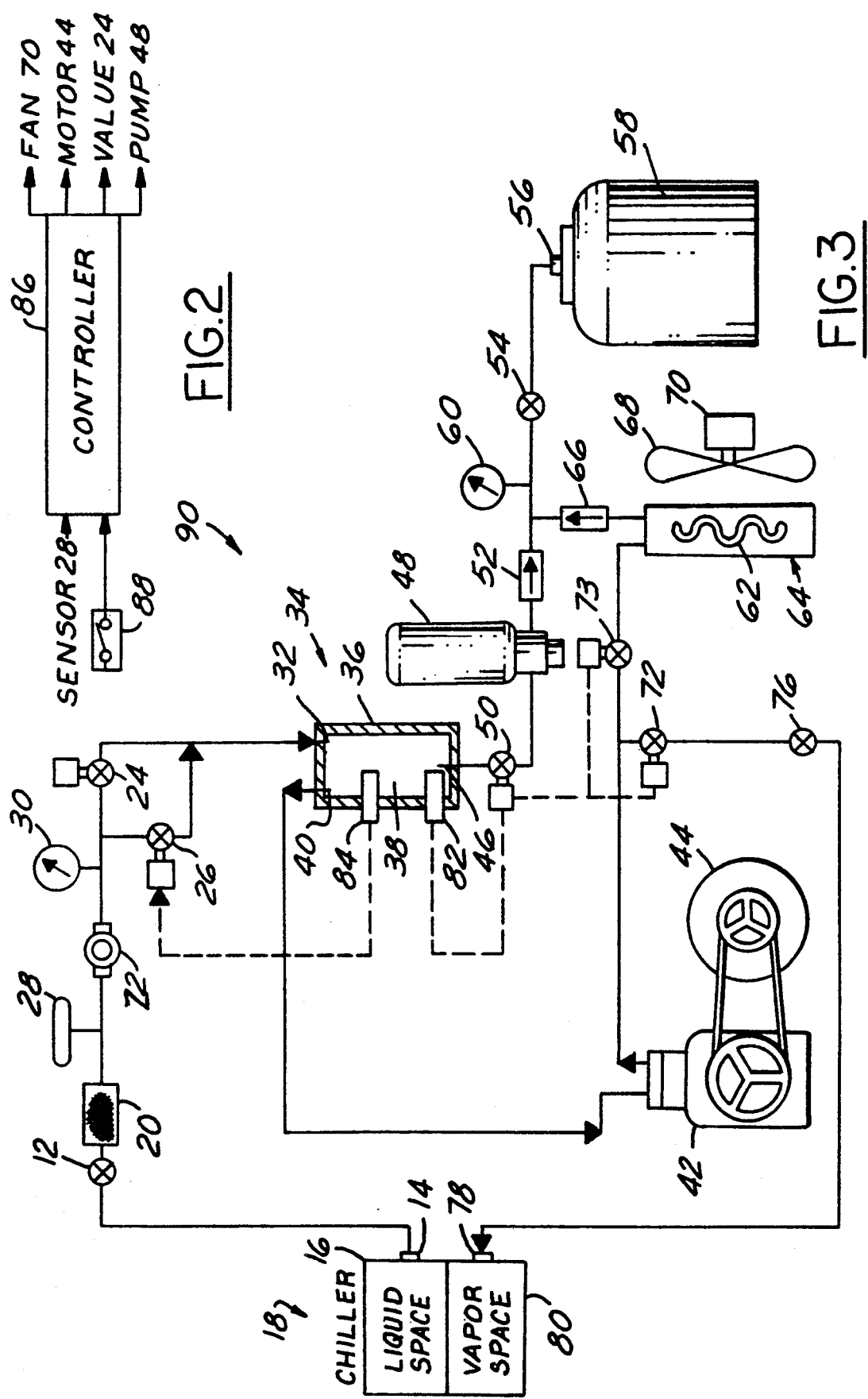

REFRIGERANT RECOVERY SYSTEM

The present invention is directed to systems for recovering refrigerant from refrigeration equipment such as air conditioning and heat pump equipment, and more particularly to a system for recovering low-pressure refrigerant primarily in liquid phase.

BACKGROUND AND OBJECTS OF THE INVENTION

Many scientists contend that release of refrigerants into the atmosphere deleteriously affects the ozone layer that surrounds and protects the earth from ultraviolet solar radiation. Recent international discussions and treaties, coupled with related regulations and legislation, have renewed interest in devices for recovery and storage of used refrigerants from refrigeration equipment for later purification and reuse or for proper disposal. U.S. Pat. No. 4,261,178, assigned to the assignee hereof, discloses a refrigerant recovery system in which the inlet of a compressor is coupled through an evaporator and through a manual valve to the refrigeration equipment from which refrigerant is to be recovered. The compressor outlet is connected through a condenser to a refrigerant storage container. The condenser and evaporator are combined in a single assembly through which cooling air is circulated by a fan. Content of the storage container is monitored by a scale upon which the container is mounted for sensing weight of liquid refrigerant in the container, and by a pressure switch coupled to a the fluid conduit between the condenser and the container for sensing vapor pressure within the storage container. A full-container condition sensed at the scale or a high-pressure condition sensed at the pressure switch terminates operation of the compressor motor. A vacuum switch is positioned between the inlet valve and the evaporator for sensing evacuation of refrigerant from the refrigeration equipment and automatically terminating operation of the compressor motor.

U.S. Pat. No. 4,768,347, also signed to the assignee hereof, discloses a refrigerant recovery system that includes a compressor having an inlet coupled through an evaporator and through a solenoid valve to the refrigeration equipment from which refrigerant is to be withdrawn, and an outlet coupled through a condenser to a refrigerant storage container or tank. The refrigerant storage container is carried by a scale having a limit switch coupled to control electronics to prevent or terminate further refrigerant recovery when the container is full. The scale comprises a platform pivotally mounted by a hinge pin to a wheeled cart, which also carries the evaporator/condenser unit, compressor, control electronics, and associated valve and hoses.

Although the systems disclosed in the noted patents address and overcome problems theretofore extant in the art, further improvements remain desirable. For example, a problem remains relative to recovering refrigerant from large commercial chiller systems and the like that employ low-pressure refrigerants such as R11 and R123. The boiling point of trichloro-monofluoromethane (R11) is 74.9° F., and the boiling point of dichloro-trifluoroethane (R123) is 82.2° F. In order to function at normal evaporation temperatures in the 40° to 50° F. range, each of these refrigerants must operate at a considerable vacuum. A recovery system for low-pressure refrigerant of this character would require an significant amount of auxiliary heat in an evaporator if the refrigerant were pumped during recovery only in vapor phase, requiring accessive energy and long recovery times.

It is therefore a general object of the present invention to provide a system for recovering low-pressure refrigerants in which the refrigerant is recovered primarily in liquid phase, in which recovery time is optimized as a function of input refrigerant phase, and/or in which heating of inlet refrigerant is minimized. Another and more specific object of the present invention is to provided a refrigerant recovery system of the described character in which a compressor is employed for drawing refrigerant from equipment under service, and in which a liquid refrigerant pump is employed to bypass liquid refrigerant from the compressor directly to a refrigerant storage container. Another and related object of the present invention is to provide a refrigerant recovery system of the described character that operates automatically without operator intervention.

SUMMARY OF THE INVENTION

A refrigerant recovery system in accordance with the present invention includes a refrigerant accumulator having an inlet port for connection to the liquid port of equipment from which refrigerant is to be recovered, a vapor outlet port connected to the inlet of a refrigerant compressor, and a liquid outlet port. A valve connects the liquid outlet port of the accumulator to the inlet of a liquid refrigerant pump, which has an outlet for connection to a refrigerant storage container. A liquid refrigerant sensor is coupled to the accumulator, and is responsive to presence of liquid refrigerant within the accumulator, for operating the valve and thereby connecting the accumulator liquid outlet port to the liquid pump. Thus, operation of the compressor functions to draw refrigerant from the equipment under service into the accumulator by reducing pressure within the accumulator, while the liquid pump operates to pump liquid refrigerant collected within the accumulator directly to the refrigerant storage container bypassing the compressor. A second valve is likewise responsive to the liquid refrigerant sensor for connecting the compressor outlet to the vapor port of refrigeration equipment under service, such that any refrigerant in vapor phase at the accumulator from the equipment is returned to the equipment as long as liquid remains in the accumulator.

The accumulator in the preferred embodiment of the invention comprises a canister having an open internal volume in which the liquid refrigerant sensor is disposed for sensing accumulation of liquid refrigerant at the lower portion of the canister volume. The first and second valves preferably take the form of solenoid valves automatically responsive to such liquid sensor for opening the valves when liquid refrigerant is accumulated in the lower portion of the canister volume, and for closing the valves when liquid refrigerant is absent from the canister. The compressor outlet is also connected to the refrigerant storage container through a condenser for completing recovery of refrigerant vapor from the accumulator and the system under service after all liquid refrigerant has been withdrawn from the accumulator.

The refrigerant input to the accumulator preferably takes the form of a first flow control device such as a solenoid valve responsive to activation of the recovery system for connecting the accumulator inlet to the equipment under service. The flow capacity of this valve is less then that of the liquid pump. A second valve is connected in parallel with the flow control valve, and is responsive to a second liquid refrigerant sensor disposed in an upper portion of the accumulator. The second valve opens and thereby enhances inlet flow capacity when liquid refrigerant is below the level of the second sensor, and closes and thereby reduces flow capacity when liquid refrigerant within the accumulator reaches the level of the second sensor. In this way, throughput of refrigerant is greatly enhanced in either liquid, vapor or mixed liquid/vapor phase without overflowing the accumulator and potentially passing liquid refrigerant to the compressor inlet.

In the preferred embodiment of the invention for recovering low-pressure refrigerant, a pressure regulator is positioned between the second valve and the vapor port of the equipment under service, and the compressor outlet is also connect to a condenser for at least partially liquefying vaporphase refrigerant fed by the compressor to the storage vessel. In a modified embodiment of the invention for recovering highpressure refrigerant, the pressure regulator is deleted, and a third solenoid valve is connected between the compressor outlet and the condenser. The third solenoid valve is operated conjointly with the second valve, so that the compressor outlet is alternatively connected either to the vapor port of the equipment under service, or to the condenser, as a function of level of refrigerant in the accumulator.

BRIEF DESCRIPTION OF THE DRAWINGS

The invention, together with additional objects, features and advantages thereof, will be best understood from the following description, the appended claims and the accompanying drawings, in which:

FIG. 2 is a functional block diagram of electronics for controlling the system of FIG. 1; and FIG. 3 is a schematic diagram of a refrigerant recovery system in accordance with a modified embodiment of the invention for recovering high-pressure refrigerant.

DETAILED DESCRIPTION OF PREFERRED EMBODIMENT

Figure 1:
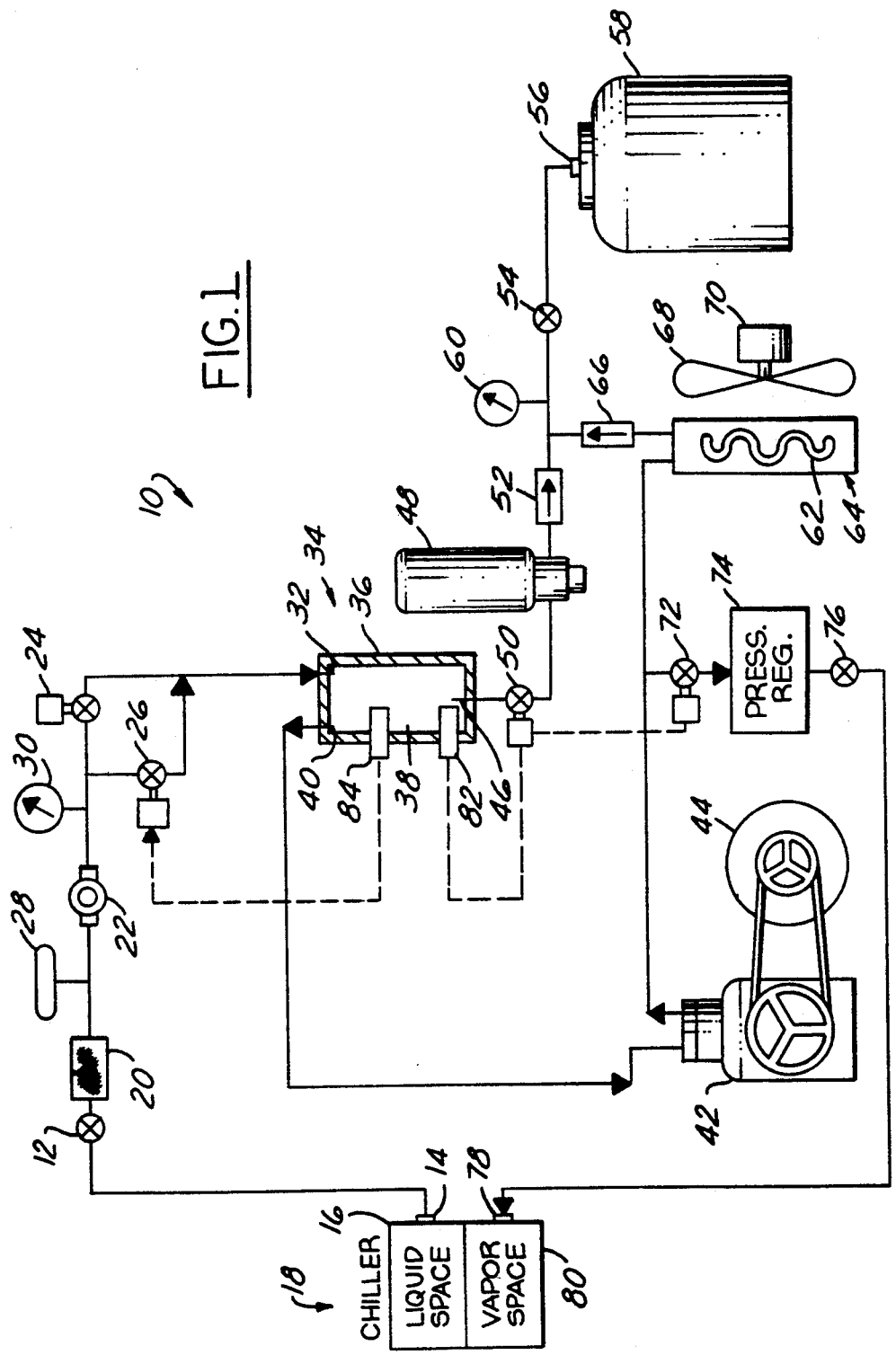
FIG. 1 is a schematic diagram of a refrigerant recovery system in accordance with a presently preferred embodiment of the invention for recovering low-pressure refrigerant.

FIG. 1 illustrates a refrigerant recovery system 10 in accordance with a presently preferred embodiment of the invention as comprising an input valve 12 coupled to a connector 14 for connection to the liquid port of the liquid space 16 of a chiller 18 from which refrigerant is to be withdrawn. Refrigerant from valve 12 is fed through a filter 20 and a sight glass 22 to the inlet sides of first and second flow control solenoid valves 24, 26. A pressure sensor 28 is connected between filter 20 and sight glass 22. A pressure gauge 30 is connected between sight glass 22 and valves 24, 26. A refrigerant accumulator 34 comprises a canister 36 having an open internal volume 38. An inlet port 32 positioned at the upper portion of volume 38 is connected to the outlet sides of valve 24, 26 in parallel. A vapor outlet port 40, also positioned at the upper portion of canister volume 38, is connected to the inlet of a refrigerant compressor 42 driven by an electric motor 44. Accumulator 34 also has a liquid refrigerant outlet port 46 disposed at the lower portion of canister volume 38.

A liquid refrigerant pump 48 has an inlet connected through a solenoid valve 50 to accumulator liquid outlet port 46, and an outlet connected through a check valve 52 and a manual valve 54 to a connector 56 for coupling to a refrigerant storage container 58. A pressure gauge 60 is connected between check valve 52 and valve 54 for monitoring pressure within container 58. The outlet of compressor 42 is connected through the coil 62 of a condenser 64, and thence through a check valve 66 to manual valve 54 in parallel with valve 52. A fan 68 is driven by a motor 70 for cooling condenser 64. The outlet of compressor 42 is also connected through a solenoid valve 72, a pressure regulator 74 and a manual valve 76 to a connector 78 for connection to the vapor port of chiller 18 coupled to the chiller vapor space 80. The liquid refrigerant flow rate through valve 24 is less than the flow rate of pump 48, while the flow rate of valves 24, 26 combined is greater than the pump flow rate.

A first liquid refrigerant level sensor 82 is disposed in the lower portion of canister volume 38, and is connected to the solenoids of valves 50 and 72 for opening the respective valves when liquid refrigerant is present at the lower portion of canister volume 38 and closing the valves when such liquid refrigerant is absent. A second liquid refrigerant level sensor 84 is positioned at a intermediate level within canister volume 38 above sensor 82 and below the top of the canister for sensing a higher level of liquid refrigerant within the canister volume. Sensor 84 is operatively coupled to the solenoid of valve 26 for opening valve 26 when liquid refrigerant within accumulator 34 is below the level of sensor 84, and closing valve 26 when liquid refrigerant within accumulator 34 is at the level of sensor 84. Sensors 82, 84 may be of any suitable type. FIG. 2 illustrates an electronic controller 86 that receives an input from an operator switch 88 for initiating a refrigerant recovery operation, and a second input from pressure sensor 28 for terminating the recovery operation. Outputs of controller 86 are connected to fan motor 70, compressor motor 44, valve 24 and pump 48 for operating the valve, pump and motors during a recovery operation, and for terminating operation of motor 70 motor 44 and pump 48, and enclosing valve 24 when a recovery operation has been completed.

In operation, an operator first couples connector 14 to the liquid port of chiller 18, and couples connector 78 to the vapor port of the chiller. Connector 56 is coupled to the vapor port of container 58. The operator may then initiate a recovery operation by closing switch 88 (FIG. 2), whereupon controller 86 applies electrical power to motor 44 to energize compressor 42, to motor 70 for energizing fan 68, to pump 48, and to the solenoid of valve 24 to open the valve. At this point, it is assumed that accumulator 34 is empty, so that sensor 82 closes valves 50, 72 and sensor 84 opens valve 26. Compressor 42 functions to reduce pressure within accumulator 34 to draw the low-pressure refrigerant from chiller 18 through the liquid port primarily in liquid phase.

As liquid refrigerant flows into accumulator 34 through both valves 24, 26 and begins to accumulate within the accumulator, sensor 82 opens valve 50 so that liquid refrigerant pump 48 pumps the liquid refrigerant from accumulator 34 directly into storage container 58. At the same time, sensor 82 opens valve 72 so that vapor drawn from accumulator 34 by compressor 42 is automatically returned to vapor space 80 of chiller 18. As operation continues, since the flow capacity of valves 24, 26 in combination is greater than flow capacity of liquid refrigerant pump 48, the liquid refrigerant rises within accumulator 34, eventually reaching the level of sensor 84. At this point, sensor 84 closes valve 26, so that liquid refrigerant flows to accumulator 34 only through valve 24. In this way, sensor 84 prevents over filling of accumulator 34, and possible feeding of liquid refrigerant to compressor 42. Since the flow rate of valve 24 is less than that of pump 84, pump 84 begins to draw down liquid refrigerant from within accumulator 34. When the liquid refrigerant is again below the level of sensor 84, sensor 84 opens valve 26 to increase inlet flow. Valve 84 thus functions to maintain the level of liquid refrigerant within accumulator 34 at about the level of sensor 84 as long as liquid refrigerant is available from chiller 18.

As chiller 18 empties of liquid refrigerant, the liquid refrigerant within accumulator 34 falls below the level of sensor 84, opening valve 26. As pump 48 continues to draw liquid from accumulator 34, the liquid refrigerant level eventually falls below the level of sensor 82, closing valves 50, 72, and thereby terminating effective operation of liquid refrigerant pump 48. In the meantime, compressor 42 continues to pull refrigerant vapor from chiller 18 and accumulator 34, and to feed such vapor through condenser 64 to storage container 58. When the vapor pressure of refrigerant within chiller 18 falls below the level of sensor 28, sensor 28 signals controller 86 (FIG. 2) to terminate the recovery operation.

FIG. 3 illustrates a modified embodiment 90 for recovering high-pressure refrigerant in accordance with the principles of the present invention. Only the differences between the system 10 of FIG. 1 and the system 90 of FIG. 3 need be discussed. A solenoid valve 73 is positioned between condenser 64 and the outlet of compressor 42, and is operatively coupled to level sensor 82 along with valve 72. Valve 73 is closed and valve 72 is open when liquid refrigerant is present at sensor 82. However, when accumulator 34 is dry and no liquid refrigerant is present at sensor 82, indicating that all input refrigerant is in vapor phase, valve 72 in closed and valve 73 is opened so that such input refrigerant is fed by compressor 42 through condenser 64 to container 58. When system 70 is initially operated to begin a recovery cycle, accumulator 34 is empty. To prevent compressor 42 from pressurizing container 58, the control circuitry holds valve 72 open and valve 73 closed for an initial period to allow liquid refrigerant to collect in accumulator 34 and activate sensor 82.

We claim:

1. A system for recovering refrigeration from refrigeration equipment comprising:
    a refrigerant compressor having an inlet and an outlet,
    refrigerant accumulation means having an inlet port, a vapor outlet port and a liquid outlet port,
    input means for connecting said inlet port of said accumulation means to the refrigeration equipment from which refrigerant is to be recovered,
    means for connecting said vapor outlet port to said compressor inlet such that operation of said compressor reduces pressure within said accumulation means,
    a liquid refrigerant pump having an inlet and an outlet,
    means for connecting said outlet of said liquid refrigerant pump to a refrigerant storage container, and
    means coupled to said accumulation means for operatively connecting said inlet of said liquid refrigerant pump to said liquid outlet port of said accumulation means, such that operation of said compressor functions to draw refrigerant from said input means into said accumulation means and said liquid pump pumps refrigerant from said accumulation means to the storage container.

2. The system set forth in claim 1 wherein said means coupled to said accumulation means comprises a liquid refrigerant sensor and means responsive to said sensor for operatively connecting said liquid outlet port to said liquid refrigerant pump.

3. The system set forth in claim 2 wherein said accumulation means comprises a canister having an internal volume, and wherein said liquid refrigerant sensor comprises a liquid refrigerant level sensor disposed at a lower portion of said volume.

4. The system set forth in claim 3 wherein said means responsive to said sensor comprises a solenoid valve automatically responsive to said level sensor.

5. The system set forth in claim 1 further comprising means for connecting said compressor outlet to the refrigeration equipment from which refrigerant is to withdrawn, such that refrigerant in vapor phase at said accumulation means from such equipment is returned to the equipment.

6. The system set forth in claim 5 wherein said means coupled to said accumulation means comprises a liquid refrigerant sensor, and wherein said means for connecting said compressor outlet to the equipment comprises first valve means responsive to said sensor.

7. The system set forth in claim 6 wherein said means coupled to said accumulation means further comprises second valve means responsive to said sensor for connecting said liquid outlet port to said liquid pump.

8. The system set forth in claim 6 further comprising means for connecting said compressor outlet to the refrigerant storage container when said first valve means, is closed for feeding refrigerant in vapor phase at said accumulation means to the storage container.

9. The system set forth in claim 8 wherein said means for connecting said compressor outlet to the refrigerant storage container comprises second valve means responsive to said sensor to open said second valve means when said first valve means is closed, and close said second valve means when said first valve means is open.

10. The system set forth in claim 6 wherein said means for connecting said compressor outlet to the vapor port of equipment under service further comprises a refrigerant pressure regulator.

11. The system set forth in claim 1 wherein said input means includes first means having a flow capacity less than flow capacity of said liquid refrigerant pump, and second means connected in parallel with said first means and responsive to liquid phase refrigerant within said accumulation means for opening said second means in parallel with said first means and increasing flow capacity through said first and second means in parallel to a level greater than flow capacity of said liquid pump.

12. The system set forth in claim 11 wherein said accumulation means comprises a canister having an internal volume, and wherein said second means comprises a liquid refrigerant level sensor coupled to said volume for detecting a high level of liquid refrigerant within said volume.

13. The system set forth in claim 12 wherein said second means further includes a valve responsive to said level sensor for closing said valve upon detection of a high level of liquid refrigerant within said volume.

14. A system for recovering refrigerant from refrigeration equipment having liquid and vapor ports comprising:
- a refrigerant compressor having an inlet and an outlet,
- a refrigerant accumulator having an internal volume, an inlet port and a vapor outlet port at a upper portion of said volume and a liquid outlet port at a lower portion of said volume,
- input means for connecting said inlet of said accumulator to the liquid port of the equipment from which refrigerant is to be recovered,
- means connecting said vapor outlet port to said compressor inlet,
- a liquid refrigerant pump having an inlet and an outlet,
- means for connecting said outlet of said liquid refrigerant pump to a refrigerant storage container,
- liquid refrigerant sensor means disposed in said volume and responsive to presence of liquid refrigerant within said volume,
- means responsive to said sensor means for operatively connecting said liquid outlet port to said inlet of said liquid refrigerant pump, and
- valve means responsive to said sensor means for connecting said compressor outlet to the vapor port of the refrigeration equipment.

15. The system set forth in claim 14 wherein said input means includes first flow means having a refrigerant flow capacity less than that of said liquid refrigerant pump, and second flow means responsive to said sensor means for increasing flow capacity to said accumulator.

16. The system set forth in claim 15 wherein said sensor mean comprises first and second liquid refrigerant level sensors coupled to said volume respectively for detecting low and high levels if liquid refrigerant within said volume, said first sensor being coupled to said valve means and said second sensor being coupled to said second flow means.

* * * * *